United States Patent

David et al.

[11] Patent Number: 6,069,943
[45] Date of Patent: May 30, 2000

[54] COLLABORATIVE CONFERENCING CIRCUIT

[75] Inventors: Larry John David, Constance Bay; William Allan, Ottawa; Timothy Augustus Kuechler, Calgary, all of Canada

[73] Assignee: Nortel Networks Corporation, Montreal, Canada

[21] Appl. No.: 08/980,758

[22] Filed: Dec. 1, 1997

[51] Int. Cl.$^7$ .................................................. H04M 3/42

[52] U.S. Cl. .................... 379/202; 379/420; 379/205; 370/260

[58] Field of Search ...................... 379/202, 267, 379/201, 203, 204, 205, 206, 420, 428; 370/259, 260, 261, 262

[56] References Cited

U.S. PATENT DOCUMENTS

| | | | |
|---|---|---|---|
| 4,882,745 | 11/1989 | Silver | 455/568 |
| 5,034,947 | 7/1991 | Epps | 379/202 |
| 5,109,410 | 4/1992 | Suhami et al. | 379/428 |

*Primary Examiner*—Jack Chiang
*Assistant Examiner*—Benny Q. Tieu

[57] ABSTRACT

A circuit and method is described enabling a telephone having two or more lines to have the capability of initiating two simultaneous calls, where there is two-way communication on one of the calls (the collaborating call"), and active monitoring of the second call (the "teleconference"). A router is used so that the outbound audio signal of the user can easily be switched between the teleconference and the collaborating call. At all times, the transmit path of one of the calls is muted to ensure privacy of the other call.

10 Claims, 6 Drawing Sheets

COLLABORATIVE CONFERENCING CIRCUIT

FIELD OF THE INVENTION

This invention relates to a system for teleconferencing, and in particular to such a system that permits a participant of the teleconference to collaborate separately with another party.

BACKGROUND OF THE INVENTION

Current teleconferencing systems cannot easily facilitate private conversations among teleconference participants who wish to communicate with each other (or with third parties) during a teleconference without being overheard by the remaining teleconference participants but while still being able to monitor the teleconference. In conventional teleconferencing systems, a teleconference participant desiring to collaborate with another teleconference participant or third party (the "collaborator") would be required to place the teleconference on "hold" and place a second call to the collaborator. However, there would no means for the first conferee to continue to monitor the teleconference while communicating with the collaborator. Of course, direct communication with the collaborator on the teleconference line is not feasible since that would disrupt the teleconference.

In Eppe U.S. Pat. No. 5,034,947, there is described a "whisper circuit" for a conference call that permits two parties in a conference call to conduct a whisper conference between each other without being heard by the other parties on the conference call. At the same time, the two parties to the whisper conference can still hear the entire conversation being carried on by all of the other parties to the conference call, without the other parties being aware that the two parties are engaged in a whisper conference. Teleconference participants are interconnected to a digitized conference bridge over PCM telephone carrier lines, which are connected to a cross-point switch for interchanging the PCM speech data occurring in time slots for the two whisper conferees so that the PCM speech data for the first of the two whisper conferees is placed in the time slot for the second of the two whisper conferees and vice versa. A summation circuit is utilized to sum the telephone conversations of all remaining conferees and the two interchanged telephone conversations of the whisper conferees are then selectively added to the summed signals. Intelligibility is hampered somewhat because there is no acoustic isolation of the whisper conference. This is because a whisper conferee must extract the collaborator's voice out of the summed signals. This prior art teleconferencing circuit, which requires special system based hardware and resources, does not allow a teleconference participant to initiate a whisper conference with a third party who is not a member of the teleconference.

It is beneficial to allow for whisper conferencing (or collaborative conferencing) without the need for the teleconference bridge and digital signalling processing techniques set out in this prior art patent which are typically difficult and expensive to implement. Furthermore, since a conference bridge is a shared resource concentrated at the network, there is an upper limit on the number of teleconferences that can be accommodated with whisper circuit functionality. The whisper circuit of the prior art patent will not function unless a digital voice switch hosts the teleconferencing bridge that is essential to the operation of that invention. Finally, the whisper circuit of the prior art patent restricts the number of whisper conferees to two since multiple collaborations cannot be accommodated.

SUMMARY OF THE INVENTION

The present invention provides a circuit and method for enabling a telephone having two lines (analog, digital, radio, etc.) to be connected to one call and have the capability of conducting a second simultaneous call while maintaining a monitoring function on the first call. In a teleconference initiated in accordance with the present invention, a user will be able to collaborate with a fellow conferee or third party (hereinafter referred to as a "collaborator"), while keeping track of the proceedings of the teleconference. With the use of the router of the present invention, the outbound audio signal of the user can easily be switched between the teleconference and the collaborator.

The present invention provides a telephone collaborative conferencing circuit comprising a router having a first state and a second state and a microprocessor for selectively switching the router between the first and second state, and for selectively routing voice channels through said router; the router having first and second receive channel inputs, first and second transmit channel outputs, first and second acoustic outputs and at least one acoustic input, said acoustic input and outputs being connected to transducer devices for respectively receiving and producing sounds; wherein when the router is in the first state a first receive path is defined by a first receive voice channel appearing at the first receive channel input being routed to the first acoustic output and a first transmit path is defined by a first transmit voice channel appearing at the acoustic input being routed to the first transmit channel output, and when the router is in the second state, in addition to the first receive path, a second receive path is defined by a second receive voice channel appearing at the second receive channel input being routed to the second acoustic output and a second transmit path instead of the first transmit path is defined by a second transmit voice channel appearing at the acoustic input being routed to the second transmit channel output.

In operation, the user first makes or receives the teleconference call in the normal manner on any available line. To initiate the call to the collaborator, the user presses the collaborative call key on the teleconferencing telephone set. The receive path on the teleconference line remains active, and, at the discretion of the user, may or may not be routed to another receive transducer on the teleconferencing telephone set (such as the speaker). The collaborative call is connected (both transmit and receive) to the active transducers, and is initiated in the normal fashion on the collaborative line. Once the collaborative call is established, the user's audio transmit path may be toggled between the two calls. At all times, the non-active line has its transmit path muted to ensure privacy of the collaborative call. When the collaborative call is completed, it is released using the standard call release mechanism on the teleconferencing telephone set. The teleconferencing line would then be automatically returned to the normal, non-collaborative state, with both its transmit and receive paths active.

DETAILED DESCRIPTION OF THE PREFERRED EMBODIMENT

Figure 1:
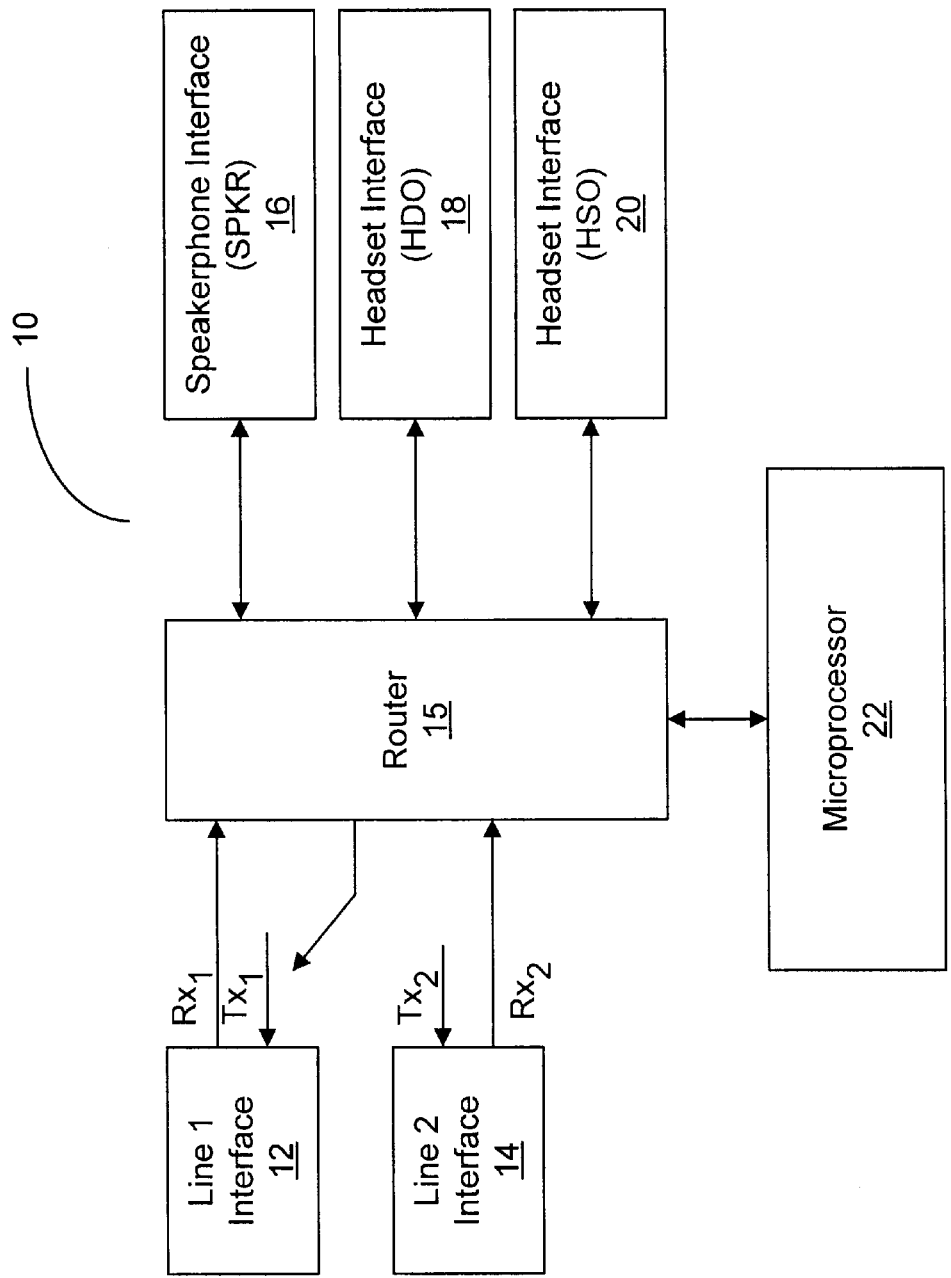
FIG. 1 is a block diagram of the collaborative conferencing circuit of the present invention showing the line interfaces, router, microprocessor, and handset, headset, and speakerphone interfaces.

The collaborative conferencing circuit 10 of the present invention consists of two line interfaces 12, 14 connected to a router 15, under the control of a microprocessor 22 as shown in FIG. 1. The router 15 also controls three acoustic outputs, labelled SPKR 16 (for the speakerphone interface), HDO 18 (for the headset interface), and HSO 20 (for the handset interface). Lines 1 and 2 (the transmit and receive channels of lines 1 and 2 are denoted by $Tx_1$, $Rx_1$, and $Tx_2$, $Rx_2$ respectively) are shown being connected to line 1 interface 12, and line 2 interface 14 respectively.

An example of the implementation of this collaborative conference circuit 10 would be Nortel's Digital Terminal Interface Chip, assigned the design code of AB06, that works in conjunction with a microprocessor running firmware code stored in read-only memory. On the basis of the firmware code, the microprocessor instructs the router 15 built into the AB06 chip to route receive voice channels and transmit voice channels in accordance with the present invention. The AB06 chip and microprocessor are designed to be a complete subsystem with which a teleconferencing telephone set can be built around. While the AB06 chip is designed to work in association with two incoming digital lines in an ISDN-like 2B+D format, it is expressly understood that the present invention works equally well in association with analog lines, as well as radio and wireless transmissions to the circuit 10.

Collaborative conferencing is an application that makes use of channels $Tx_1$, $Rx_1$, and $Tx_2$, $Rx_2$ of lines 1 and 2 and is useful in situations where a telephone conference participant wishes to initiate a private conversation with a fellow teleconference participant or third party without disrupting the original teleconference. After initiating the collaborative conference, a user will be able to monitor the teleconference in receive only mode (for example on the teleconferencing telephone set's speakerphone), while using the handset or headset to conduct a side conversation with the collaborator. Thus, there can be "collaboration" with another party while participating in the "conference". Of course, the collaborative conference call does not have to be with a single called party. Instead, the collaborative conference may itself be a separate conference call with a plurality of called parties.

Typically, the user would initiate a collaborative conference call by depressing a collaborative conference key on the teleconferencing telephone set (see FIG. 7) which is used to initiate the conference call. The microprocessor 22 is programmed to detect when a particular key is depressed. When the microprocessor 22 detects that the collaborative conference key has been depressed, the collaborative conference setup stage described in detail below will be initiated. The teleconferencing telephone set may also include a toggle key to switch active transmission between the conference call and the collaborator.

Figure 2:
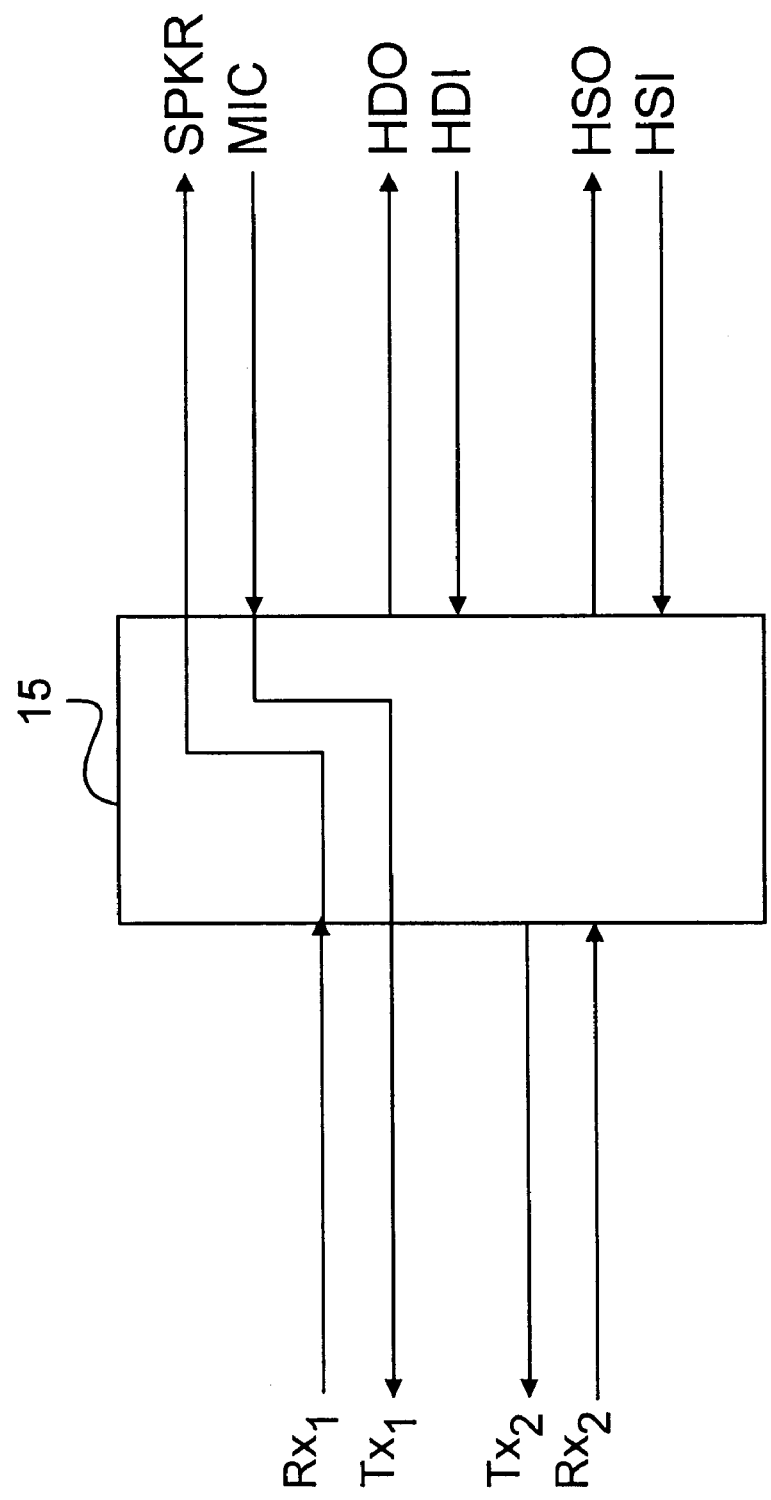
FIG. 2 is a block diagram of the router showing the transmit and receive paths for the first stage of a collaborative conference call initiated in accordance with the present invention.
Figure 3:
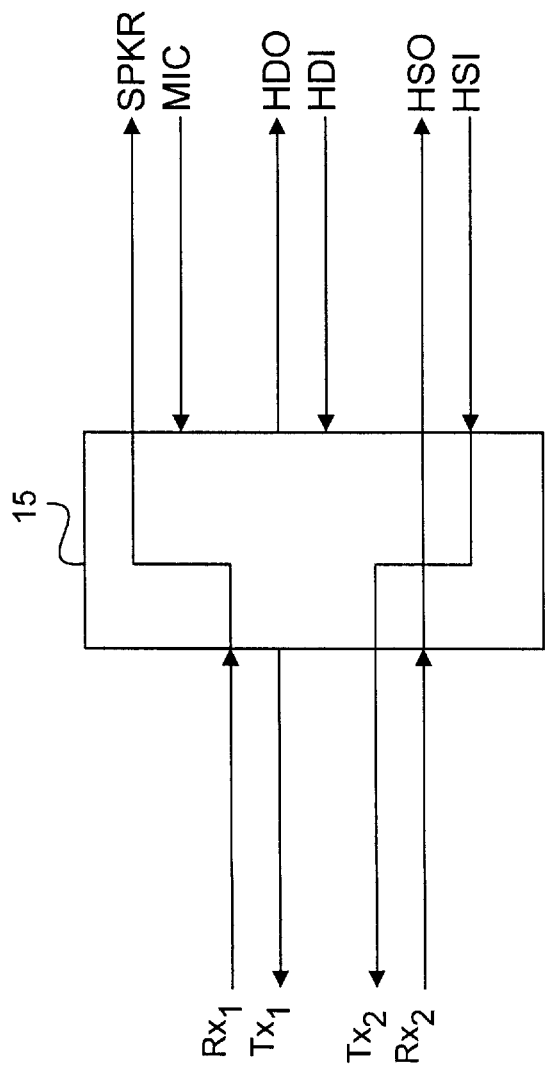
FIG. 3 is a block diagram of the router showing the transmit and receive paths for the second stage of a collaborative conference call initiated in accordance with the present invention.
Figure 4:
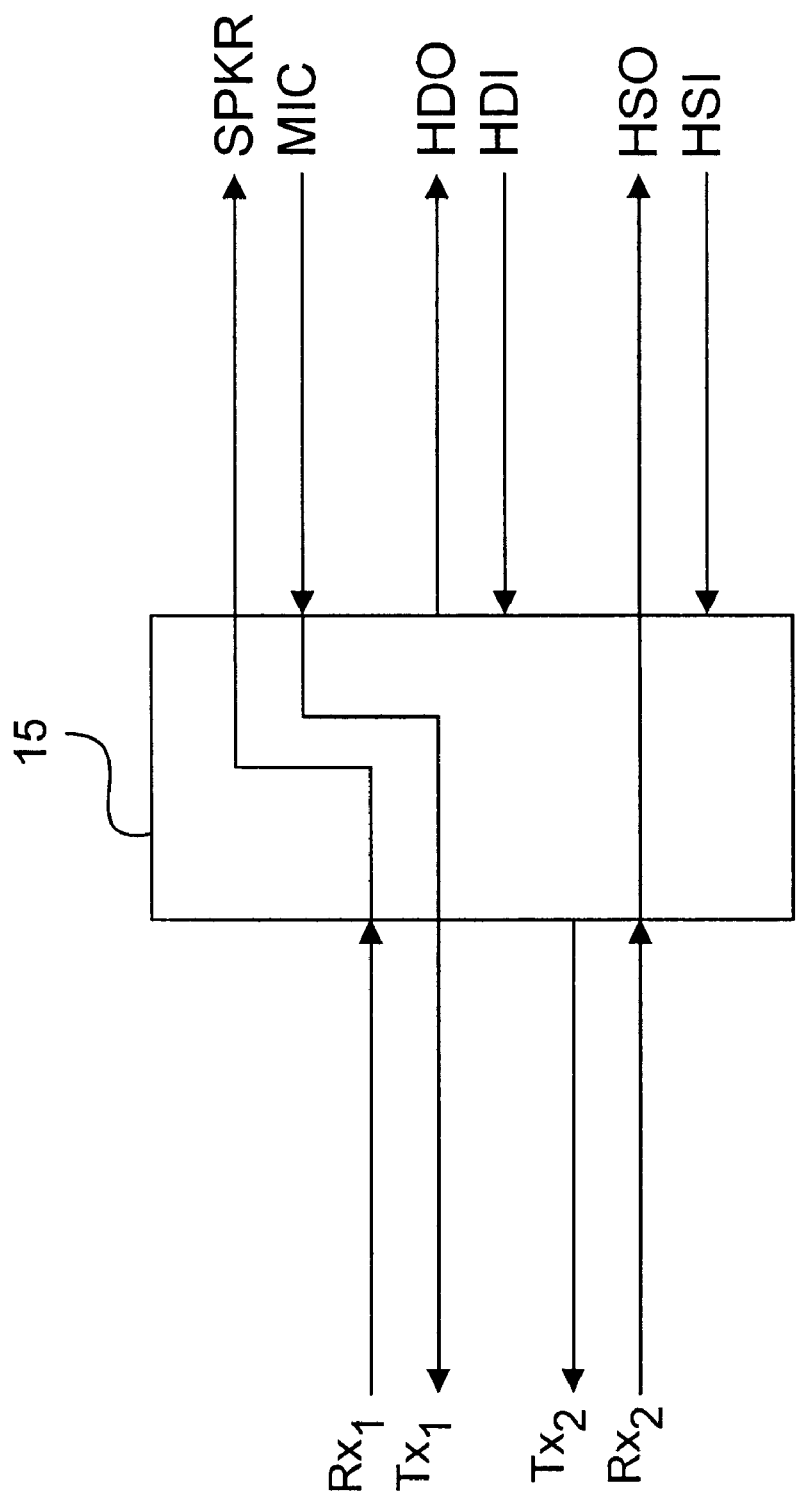
FIG. 4 is a block diagram of the router showing the transmit and receive paths for the third stage of a collaborative conference call initiated in accordance with the present invention.

FIGS. 2, 3 and 4 illustrate the three stages of operation of the present invention, namely teleconference setup, collaborative conference setup, and toggle. In FIG. 2, the transmit and receive paths for lines 1 and 2 for the teleconference setup stage are shown. The acoustic inputs for the router circuit are handset microphone interface HSI, headset microphone interface HDI, and speakerphone microphone interface MIC. The acoustic outputs for the router circuit are speakerphone interface SPKR, headset interface HDO, and handset interface HSO.

In the teleconference stage, the user initiates or receives the teleconference call in the normal manner on channels $Tx_1$, $Rx_1$. The means of setting up this initial teleconference (such as by means of a teleconference bridge, which are well known in the art) does not form part of this invention. Router 15 routes the receive path from $Rx_1$ to speakerphone interface SPKR, and the transmit path from speakerphone microphone interface MIC to channel $Tx_1$. Of course, the teleconference call could have been routed to either the headset interface HDO, or the handset interface HSO. In this state, channels $Tx_2$, $Rx_2$ are idle, and are not handling any traffic.

In FIG. 3, the transmit and receive paths for lines 1 and 2 for the collaborative conference call setup stage are shown. Typically, the user would initiate the collaborative call by depressing the collaborative call key located on the teleconferencing telephone set. Once the key is depressed, router 15 will initiate a collaborative conference call by muting the transmit portion of the conference call on channel $Tx_1$, assigning the transmit path to the collaborative conference call from handset microphone interface HSI to channel $Tx_2$, and also switching on a second receive path from channel $Rx_2$ to handset interface HSO. The collaborator may either be a fellow teleconference participant, or third party. In this state, the user continues to hear the teleconference carried on channel $Rx_1$ on the speakerphone, while being able to carry on a bi-directional collaborative conference call on channels $Tx_2$, $Rx_2$. Since channel $Tx_1$ is muted, the other members of the teleconference cannot hear the communication between the user and the collaborator, and will be totally unaware that this communication is taking place.

Though router 15 is shown routing the collaborative conference call to handset interface HSO, the collaborative conference call could have been routed to headset interface HDO.

Headset interface HDO, and headset microphone interface HDI are not essential to the operation of the invention, and are shown for illustration purposes only. At least one microphone (located in the headset, handset, telephone unit or some other location) and two speakers (located in the speakerphone, headset, headset, or some other location) are the minimum requirement for the operation of the present invention. With reference to FIG. 3, this means that the transmit path for line 2 may be assigned by router 15 from speakerphone microphone interface MIC to channel $Tx_2$. Since only one transmit path is active at any given moment, there would only be a need to have one microphone. In the circumstances of this scenario, handset microphone interface HSI would be optional to the operation of the present invention.

At any time, the user may toggle the audio transmit path between the teleconference call and the collaborative call. This stage is illustrated in FIG. 4. By depressing a toggle key that would typically be located on the teleconferencing telephone set, router 15 would mute the transmit path from HSO to channel $Tx_2$, and re-initiate the transmit path from MIC to channel $Tx_1$. Unless the collaborator were a member of the teleconference, the collaborator would hear silence while the user actively participated in the teleconference. To toggle back to the collaborator, the user would depress the toggle key and router 15 would mute the transmit path from MIC to channel $Tx_1$, and re-initiate the transmit path from HSO to channel $Tx_2$.

Once the collaborative call has been concluded, it is released using the standard release mechanism for the teleconferencing telephone set. The teleconference call on line 1 would be returned to its non-collaborative state, with both channels $Tx_1$, $Rx_1$ paths active. Line 2 (ie. $Tx_2$, $Rx_2$) would be idle.

Figure 5:
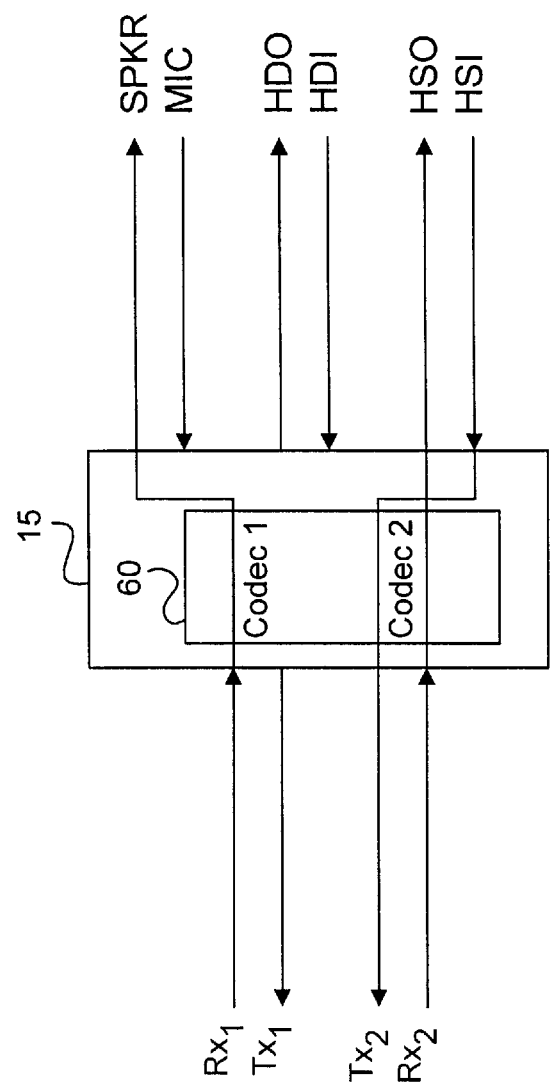
FIG. 5 is a block diagram of the CODEC selector, two CODECS and router showing the transmit and receive paths for the second stage of a collaborative conference call initiated in accordance with the present invention.

Persons skilled in the art will appreciate that while the router 15 shown in FIG. 2, 3 and 4 handles only analog lines, it can be modified to accommodate connections to digital lines. Where connections to digital lines are required, the router must be connected to two CODECS (analog to digital encoder/digital to analog decoder), and one codec selector. FIG. 5 illustrates the transmit and receive paths for lines 1 and 2 for the collaborative conference call setup stage, where channels $Tx_1$, $Rx_1$, $Tx_2$ and $Rx_2$ are digital, rather than analog as they are shown in FIG. 3. CODEC selector 60 is used to select which channel will be encoded/decoded by which CODEC. In this case, channel $Rx_1$ is being decoded by CODEC1, channel $Tx_2$ is being encoded by CODEC2, and channel $Rx_2$ is being decoded by CODEC2.

Figure 6:
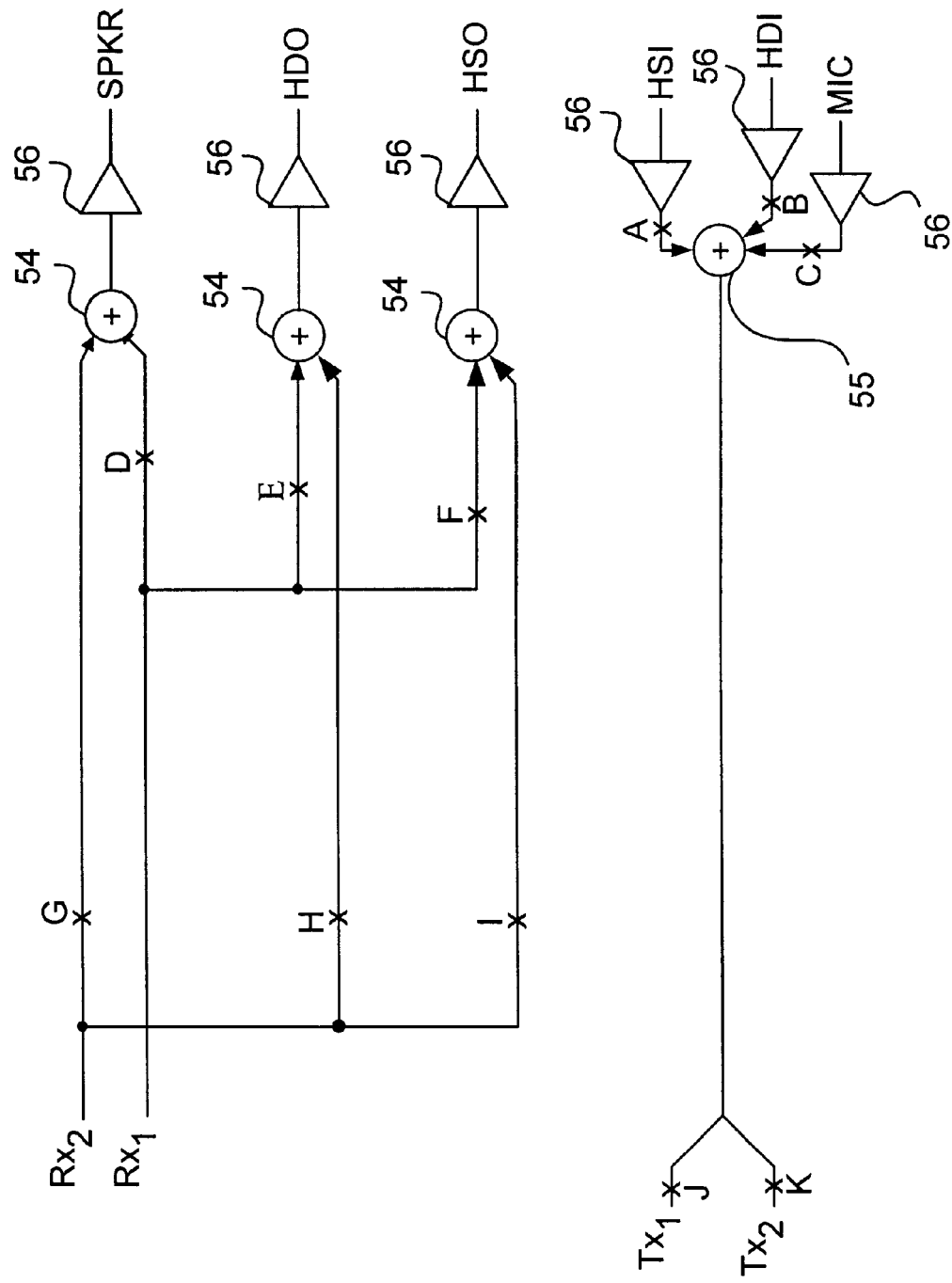
FIG. 6 is a schematic diagram of the router circuit of the present invention.

FIG. 6 is a schematic diagram of the router circuit of the present invention. All gates A, B, C, D, E, F, G, H, I, J and K are under the control of microprocessor 22 shown in FIG. 1. Microprocessor 22 runs firmware code stored in read-only memory to set the open/closed status of the gates in response to the three stages of operation of the invention shown in FIGS. 2, 3 and 4.

Receive path $Rx_1$ is shown being connected to speakerphone interface SPKR through gate D, to headset interface HDO through gate E, and to handset interface HSO through gate F. Signal adders 54 are used to sum signals $Rx_1$ and $Rx_2$. Receive path $Rx_2$ is shown being connected to speakerphone interface SPKR through gate G, to headset interface HDO through gate H, and to handset interface HSO through gate I.

Transmit path $Tx_1$ is shown being connected to handset microphone interface HSI through amplifier 56, signal adder 55, and gates A & J; to headset microphone interface HDO through amplifier 56, signal adder 55, and gates B & J; and to speakerphone microphone interface MIC through amplifier 56, signal adder 55, and gates C & J. Transmit path $Tx_2$ is shown being connected to handset microphone interface HSI through amplifier 56, signal adder 55, and gates A & K; to headset microphone interface HDO through amplifier 56, signal adder 55, and gates B & K; and to speakerphone microphone interface MIC through amplifier 56, signal adder 55, and gates C & K. Amplifiers 56 are used to amplify voice signals either to or from the router as required.

In Tables 1, 2 and 3 below, the open/closed status of gates A, B, C, D, E, F, G, H, I, J and K are set out for the three stages of collaborative conferencing (teleconference setup, collaborative conference setup, and toggle) shown in FIGS. 2, 3 and 4 respectively. It is expressly understood that with the exception of gates J and K, the open/closed status of the remaining gates in Tables 1, 2 and 3 can be altered somewhat without affecting the operation of the invention. For example, in Table 1 $Rx_1$ is routed only to speakerphone interface SPKR through gate D. However, $Rx_1$ could have been routed to either the handset interface HSO, or the headset interface HSO. Similarly, in Table 1 handset microphone interface HSI and/or headset microphone interface HDI could be enabled through gates A and B respectively, in addition to or in replace of speakerphone microphone interface MIC through gate C. As will be explained in further detail below, it is not even essential to the operation of this invention that $Rx_1$ and $Rx_2$ be routed to separate acoustic transducers. However, it is essential that only one of gates J and K (and therefore only one of $Tx_1$ and $Tx_2$) can be open at any given time while a collaborative conference is being held.

TABLE 1

Open/Closed Status of Gates During Teleconference Setup

| Gate | Open/Closed Status |
|---|---|
| A | open |
| B | open |
| C | closed |
| D | closed |
| E | open |
| F | open |
| G | open |
| H | open |
| I | open |
| J | closed |
| K | open |

TABLE 2

Open/Closed Status of Gates During Collaborative Conference Setup

| Gate | Open/Closed Status |
|---|---|
| A | closed |
| B | open |
| C | open |
| D | closed |
| E | open |
| F | open |
| G | open |
| H | open |
| I | closed |
| J | open |
| K | closed |

TABLE 3

Open/Closed Status of Gates During Toggle Between Teleconference and Collaborative Conference

| Gate | Open/Closed Status |
|---|---|
| A | closed |
| B | open |
| C | open |
| D | closed |
| E | open |
| F | open |
| G | open |
| H | open |
| I | closed |
| J | closed |
| K | open |

Following the release of the collaborative conference, channels $Tx_1$, $Rx_1$, $Tx_2$ and $Rx_2$ return to their pre-collaborative state, as set out in Table 1 above.

Of course, the above table postulates a teleconference being initiated via speaker microphone interface MIC through gate C, and a collaborative conference being initiated via handset interface HSI through gate A. This selection of interfaces is arbitrary, and was chosen for the purpose of illustration only. For example, a teleconference could be initiated via handset interface HSI through gate A, and a collaborative conference could be initiated via headset microphone interface HDI through gate B without affecting the operability of the present invention. The selection of routing for $Rx_1$ and $Rx_2$ in the above tables was also arbitrary, and could be changed without affecting the operability of the present invention.

The router circuit shown in FIG. 6 has other applications apart from merely enabling a collaborative conference. For example, in a paging application, an outside third party could initiate a call to $Rx_2$ and communicate a message to the user without the other members of the teleconference overhearing that message. Assuming the status of the gates shown in FIG. 6 is as set out in Table 1 above, a call received on channel $Rx_2$ would be connected to acoustic transducer interface HDO or HSO through gates I or H respectively. As such, the user could be "paged" without interfering with the teleconference. Alternatively, gate G could be closed to allow the paging call to be communicated through acoustic transducer SPKR, after having been added to channel $Rx_1$ through signal adder 54. A variable amplifier could be added to the receive path followed by $Rx_2$ to vary the volume of the paging signal, as compared to the teleconference signal.

Figure 7:
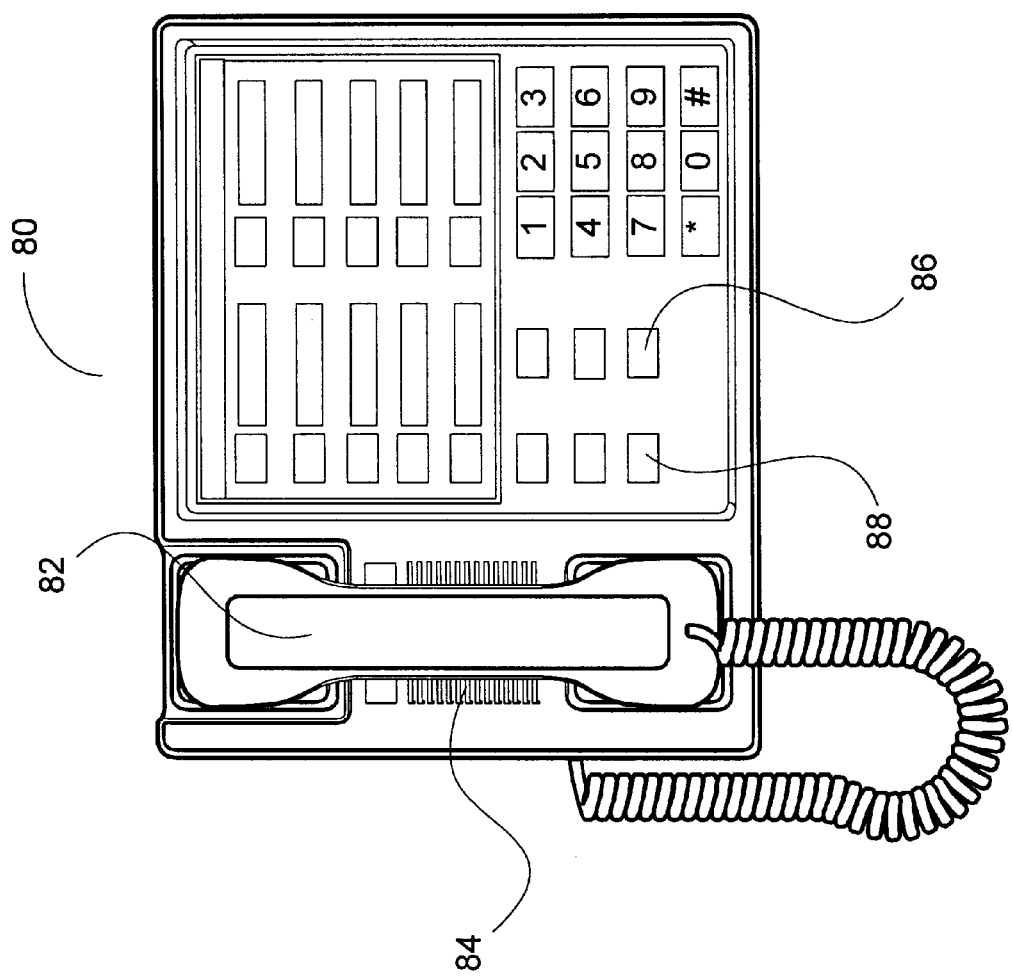
FIG. 7 is a top view of a teleconferencing telephone set that may be used in accordance with the present invention.

FIG. 7 is a top view of a teleconferencing telephone set 80 that may be used in accordance with the present invention. Telephone set 80 does not have to be exactly as depicted in FIG. 7. Any telephone containing the collaborative conferencing circuit of FIG. 1 would work in accordance with the present invention.

The collaborative conferencing circuit, including router and microprocessor (shown in FIG. 1) would be self-contained within teleconferencing telephone set 80. Handset interface HSO, and handset microphone interface HSI would be connected to handset device 82. Speakerphone interface SPKR and speakerphone microphone interface MIC would be connected to speakerphone 84. Speakerphone 84 is comprised of a microphone (for receiving acoustic input) and a speaker (for transmitting acoustic output). Headset interface HDO and headset microphone interface HDI would not be operable in teleconferencing telephone set 80, because an optional headset is not depicted.

To initiate a call to a collaborator, the user presses the collaborative call key 86 on telephone set 80. A toggle key 88 is also provided to switch active transmission between the conference call and the collaborator.

It is understood that handset interface HSO, and handset microphone interface HSI can be connected to other handset devices beyond that shown in FIG. 6. For example, handset device 82 could be a mobile cordless handset that transmits and receives radio signals from telephone set 80.

The above description of a preferred embodiment should not be interpreted in any limiting manner since variations and refinements can be made without departing from the spirit of the invention. The scope of the invention is defined by the appended claims and their equivalents.

We claim:

1. A telephone comprising:

a speakerphone and a handset;

a router having a first state and a second state and a microprocessor for selectively switching the router between the first and second state, and for selectively routing voice channels through said router;

the router having first and second receive channel inputs, first and second transmit channel outputs, first and second acoustic outputs and at least one acoustic input, said acoustic input being connected to a transducer device for receiving sounds, said first acoustic output being connected to a transducer device for producing sounds through any one of said speakerphone and handset, and said second acoustic output being connected to a transducer device for producing sounds through the other of said speakerphone and handset;

wherein when the router is in the first state a first receive path is defined by a first receive voice channel appearing at the first receive channel input being routed to the first acoustic output and a first transmit path is defined by a first transmit voice channel appearing at the acoustic input being routed Lo the first transmit channel output, and when the router is in the second state, in addition to the first receive path, a second receive path is defined by a second receive voice channel appearing at the second receive channel input being routed to the second acoustic output and a second transmit path instead of the first transmit path is defined by a second transmit voice channel appearing at the acoustic input being routed to the second transmit channel output.

2. The telephone of claim 1 wherein said router further includes a second acoustic input and wherein when the router is in the second state, in addition to the first receive path, a second receive path is defined by a second receive voice channel appearing at the second receive channel input being routed to the second acoustic output and a second transmit path instead of the first transmit path is defined by a second transmit voice channel appearing at the second acoustic input being routed to the second transmit channel output.

3. The telephone of claim 1 wherein said router further includes an analog-to-digital converter having one input and two outputs, wherein said input is connected to said acoustic input, and said outputs are connected to said first and second transmit channel outputs, and a digital-to-analog converter having two inputs and two outputs wherein said inputs are connected to said first and second receive channel inputs and said outputs are connected to said acoustic outputs.

4. The telephone of claim 1 wherein said acoustic input is connected to a microphone, and said first and second acoustic outputs are connected to acoustic transducers which encompass any two of a headset microphone, a speakerphone, and a handset microphone.

5. The telephone of claim 1 wherein when the router is in the second state, in addition to the first receive path, a second receive path is defined by a second receiver voice channel appearing at the second receive channel input being routed to the first acoustic output and a second transmit path instead of the first transmit path is defined by a second transmit voice channel appearing at the acoustic input being routed to the second transmit channel output.

6. The telephone of claim 1 further comprising a collaborative conference key, wherein said microprocessor contains collaborative conferencing key detection means, and wherein said microprocessor selectively switches the router between the first and second state upon detection that the collaborative conference key has been depressed.

7. The telephone of claim 1 further comprising a toggle key, and wherein said microprocessor contains toggle key detection means, wherein said microprocessor selectively switches the router between the second and first state upon detection that the toggle key has been depressed.

8. The telephone of claim 1 further comprising a headset, and wherein said first acoustic output being connected to a transducer device for producing sounds through any one of said speakerphone, handset and headset, and said second acoustic output being connected to a transducer device for producing sounds through any other of said speakerphone, handset and headset.

9. A method of routing voice channels through a router circuit to and from an acoustic transducer device, said router having first and second receive channel inputs, transmit channel outputs, acoustic outputs, and an acoustic input, said method comprising the steps of:

receiving a first receive voice channel at said first receive channel input, routing said first receive voice channel to said first acoustic output for producing sounds through any one of a speakerphone and handset;

receiving a first transmit voice channel at said acoustic input;

routing said first transmit voice channel to said transmit channel output;

receiving a second receive voice channel at said second receive channel input;

routing said second receive voice channel to said second acoustic output for producing sounds through the other of said speakerphone and handset;

deactivating said first transmit channel and routing a second transmit voice channel appearing at said acoustic input to said second transmit channel output while said second receive voice channel remains active.

10. The method of claim 9 wherein said first acoustic output produces sounds through any one of a speakerphone, handset and headset and said second acoustic output produces sounds through any other of said speakerphone, handset and headset.

* * * * *